US012276289B1

(12) United States Patent
Pelini

(10) Patent No.: US 12,276,289 B1
(45) Date of Patent: Apr. 15, 2025

(54) HYDRAULIC CYLINDER TOP END CAP

(71) Applicant: Mark Pelini, Valrico, FL (US)

(72) Inventor: Mark Pelini, Valrico, FL (US)

( * ) Notice: Subject to any disclaimer, the term of this patent is extended or adjusted under 35 U.S.C. 154(b) by 0 days.

(21) Appl. No.: 18/660,988

(22) Filed: May 10, 2024

(51) Int. Cl.
*F15B 15/14* (2006.01)

(52) U.S. Cl.
CPC ........ *F15B 15/1433* (2013.01); *F15B 15/149* (2013.01)

(58) Field of Classification Search
CPC ..... F15B 15/1433; F15B 15/149; F15B 15/16
See application file for complete search history.

(56) References Cited

U.S. PATENT DOCUMENTS

| | | | | |
|---|---|---|---|---|
| 3,168,853 A * | 2/1965 | Prince | F15B 15/24 | 92/163 |
| 3,650,182 A * | 3/1972 | Phillips | F16J 10/02 | 403/375 |
| 4,357,858 A * | 11/1982 | Wedman | F15B 15/1438 | 285/305 |
| 4,671,169 A * | 6/1987 | Hillier | F15B 15/1433 | 92/85 B |
| 4,771,678 A * | 9/1988 | Walker | F16B 3/04 | 92/256 |
| 4,794,685 A * | 1/1989 | Hillier | B22D 25/02 | 228/171 |
| 6,101,922 A * | 8/2000 | King | F15B 15/1438 | 92/164 |
| 6,439,103 B1 * | 8/2002 | Miller | F15B 15/1438 | 92/169.1 |
| 7,434,504 B2 * | 10/2008 | Fanaletti | F15B 15/1438 | 92/169.1 |
| 8,807,016 B2 * | 8/2014 | Beumer | F15B 15/1438 | 92/169.1 |
| 10,151,333 B2 * | 12/2018 | Besliu | F15B 15/1438 | |
| 10,472,200 B2 * | 11/2019 | Re | B65H 16/04 | |
| 2023/0366414 A1 * | 11/2023 | Rosenboom | F15B 15/16 | |

* cited by examiner

*Primary Examiner* — Michael Leslie
(74) *Attorney, Agent, or Firm* — Edward P Dutkiewicz

(57) ABSTRACT

There is an outer surface having a first upper O ring groove and a second lower O ring groove. The outer surface has a pressure line aperture therein. The outer surface has a snap ring groove and a third sweep O ring groove. The top end cap has a lower portion and an upper portion. The pressure line aperture has a thread. The inner surface forms a passageway through the length of the top end cap.

9 Claims, 6 Drawing Sheets

HYDRAULIC CYLINDER TOP END CAP

BACKGROUND OF THE INVENTION

Rule 1.78 (F)(1) Disclosure

The Applicant has not submitted a related pending or patented non-provisional application within two months of the filing date of this present application. The invention is made by a single inventor, so there are no other inventors to be disclosed. This application is not under assignment to any other person or entity at this time.

There are no cross referenced or related applications which are direct to, or related to, the present application.

There is no research of development of this application which is federally sponsored.

FIELD OF THE INVENTION

The present invention relates to a hydraulic cylinder top end cap and more particularly pertains to a hydraulic cylinder top end cap which is locked into a hydraulic cylinder using a snap ring.

DESCRIPTION OF THE PRIOR ART

The use of hydraulic cylinder end caps is known in the prior art. More specifically, hydraulic cylinder end caps previously devised and utilized for the purpose of closing off the ends of hydraulic cylinders are known to consist basically of familiar, expected, and obvious structural configurations, notwithstanding the number of designs encompassed by the prior art which has been developed for the fulfillment of countless objectives and requirements.

While the prior art devices fulfill their respective, particular objectives and requirements, the prior art does not describe hydraulic cylinder top end cap that allows the end cap to be secured with a snap ring rather than being threaded into a hydraulic cylinder.

In this respect, the hydraulic cylinder top end cap according to the present invention substantially departs from the conventional concepts and designs of the prior art, and in doing so provides an apparatus primarily developed for the purpose of providing a cost effective way of sealing a hydraulic cylinder.

Therefore, it can be appreciated that there exists a continuing need for a new and improved hydraulic cylinder top end cap which can be used for sealing a hydraulic cylinder with a thread. In this regard, the present invention substantially fulfills this need.

SUMMARY OF THE INVENTION

In view of the foregoing disadvantages inherent in the known types of hydraulic cylinder end caps now present in the prior art, the present invention provides an improved hydraulic cylinder top end cap. As such, the general purpose of the present invention, which will be described subsequently in greater detail, is to provide a new and improved hydraulic cylinder top end cap which has all the advantages of the prior art and none of the disadvantages.

In describing this invention, the word "coupled" may be used. By "coupled" is meant that the article or structure referred to is joined, either directly, or indirectly, to another article or structure. By "indirectly joined" is meant that there may be an intervening article or structure imposed between the two articles which are "coupled". "Directly joined" means that the two articles or structures are in contact with one another or are essentially continuous with one another.

In describing aspects of the invention, the word "generally" may be used. The term, "generally" when used to describe a configuration means that the configuration includes those aspects which are within normal manufacturing parameters of acceptance. By way of example, the term "generally round" may be used. This should be interpreted to mean that the configuration may be perfectly round, but may also have a radius which is not exact, but is within the manufacturing parameters. For example, a basketball may be generally round, but not be perfectly round.

By adjacent to a structure is meant that the location is near the identified structure.

To attain the objects of the invention, the present invention essentially comprises a hydraulic cylinder top end cap comprising several components, in combination:

There is an outer surface having a round configuration, with the round configuration having a first external diameter. The outer surface has an upper portion, with an upper extent, and a lower portion, with a lower extent. There is a length between the upper extent and the lower extent.

The upper extent of the outer surface has a flat configuration with a centrally located upward beveled protrusion. The lower extent of the outer surface has a flat circular ring configuration.

The lower portion of the outer surface of the top end cap has a first lower O ring groove and a second upper O ring groove. The first lower O ring groove and the second upper O ring groove each have a first width and a first depth. In another embodiment, there may be one O ring groove, with an associated O ring and in another embodiment there may be a plurality of O ring grooves.

The lower portion outer surface has a pressure line aperture therein, with the pressure line aperture having a thread.

The pressure line aperture is located between the first lower O ring groove and the second upper O ring groove. In other embodiments, the pressure aperture may be located toward the lower extent, below the first O ring.

The upper portion of the outer surface of the hydraulic cylinder top end cap has a snap ring groove. The snap ring groove of the upper portion of the outer surface has a second depth and a second width. The second depth is greater that the first depth and the second width is less than the first width. The snap ring groove of the outer surface is located between the second upper O ring groove and the upper extent of the outer surface.

The outer surface has a sweep O ring groove. The sweep O ring groove has a third width and a third depth. The third width of the sweep O ring groove is less than the first lower O ring groove and the second upper O ring groove. The third width of the sweep O ring groove is greater than the second width of the snap ring groove. The third depth of the sweep O ring groove is less than the first depth of the first lower O ring groove and the second upper O ring groove.

There is an inner surface of the top end cap. The inner surface of the top end cap forms a passageway through the top end cap. The inner surface has a lower portion, with a first internal diameter, and an upper portion, with a second internal diameter.

The lower portion of the inner surface of the top end cap has a lower extent. The upper portion of the inner surface of the top end cap has an upper extent.

The first internal diameter of the inner surface lower portion of the top end cap bis greater than the second internal diameter of the inner surface upper portion of the top end cap. The lower portion of the inner surface of the top end cap has the threaded pressure line aperture there through.

The lower extent of the lower portion of the inner surface of the top end cap has a step therein. The step of the lower extent of the lower portion of the inner surface of the top end cap has a third internal diameter. The third internal diameter of the step of the lower extent of the lower portion of the inner surface of the top end cap has an outwardly beveled lowermost extent. The inner surface upper portion has a lower O ring groove and an upper O ring groove. The lower O ring groove and the upper O ring groove of the inner surface upper portion of the top end cap each have the first width and the first depth.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hydraulic cylinder top end cap which has all of the advantages of the prior art hydraulic cylinder end caps and none of the disadvantages.

It is another object of the present invention to provide a new and improved hydraulic cylinder top end cap which may be easily and efficiently manufactured and marketed.

It is further object of the present invention to provide a new and improved hydraulic cylinder top end cap which is of durable and reliable constructions.

An even further object of the present invention is to provide a new and improved hydraulic cylinder top end cap which is susceptible of a low cost of manufacture with regard to both materials and labor, and which accordingly is then susceptible of low prices of sale to the consuming public, thereby making such hydraulic cylinder top end cap economically available to the buying public.

Even still another object of the present invention is to provide a hydraulic cylinder top end cap for sealing a hydraulic cylinder with the use of a threaded end cap.

Lastly, it is an object of the present invention to provide a new and improved hydraulic cylinder top end cap which has an outer surface having a first upper O ring groove and a second lower O ring groove. The outer surface has a pressure line aperture therein. The outer surface has a snap ring groove and a third sweep O ring groove. The top end cap has a lower portion and an upper portion. The pressure line aperture has a thread. The inner surface forms a passageway through the length of the top end cap.

It should be understood that while the above-stated objects are goals which are sought to be achieved, such objects should not be construed as limiting or diminishing the scope of the claims herein made.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
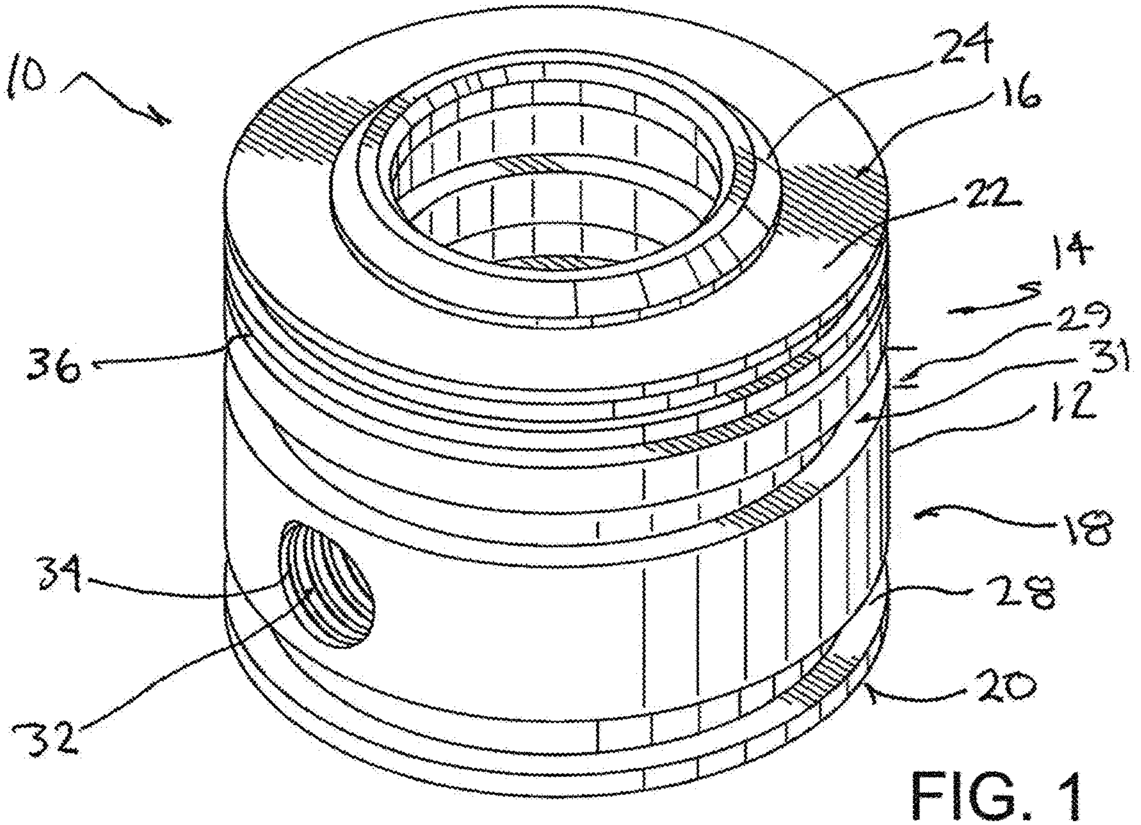
FIG. 1 is a top right perspective view of the invention.
Figure 2:
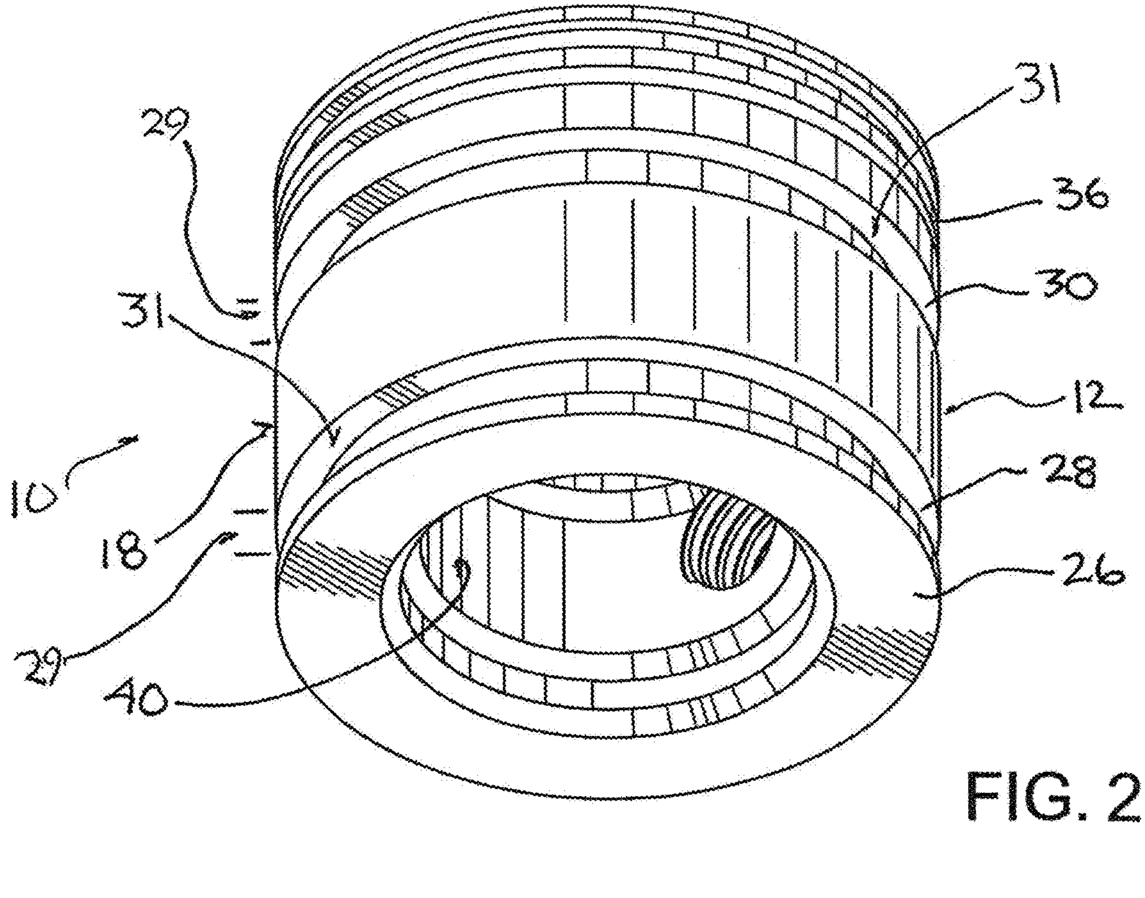
FIG. 2 is a bottom left perspective view thereof.
Figure 3:
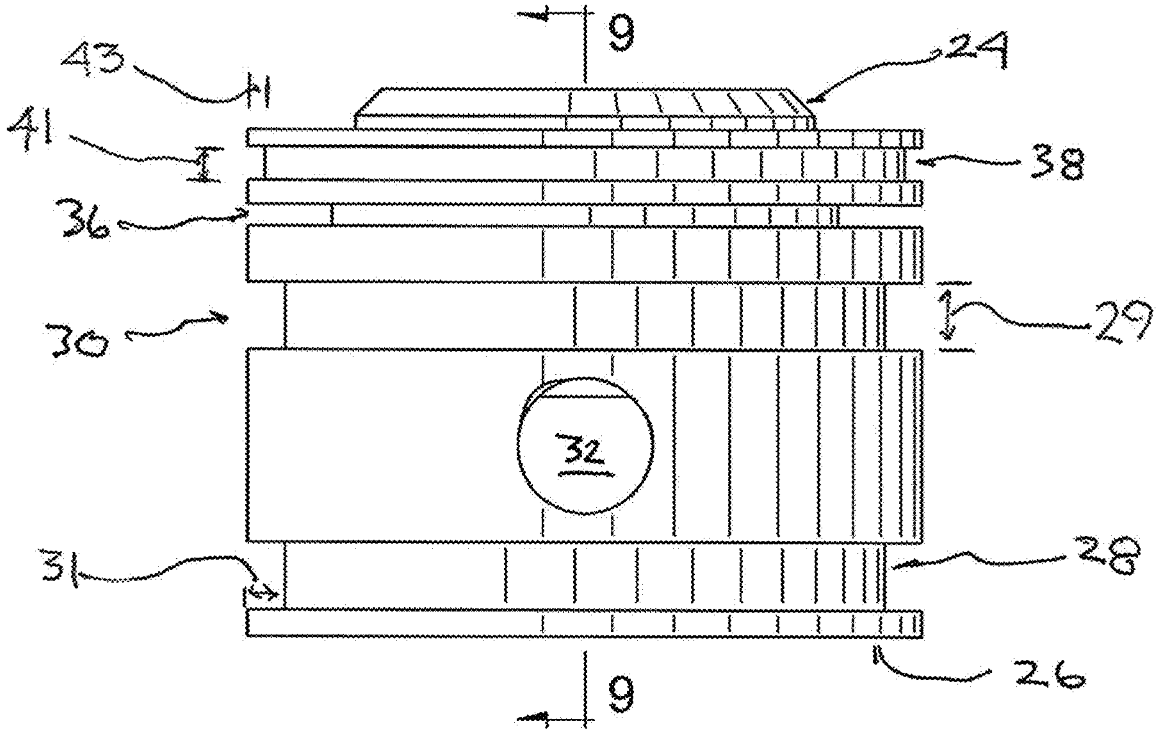
FIG. 3 is a front elevational view thereof.
Figure 4:
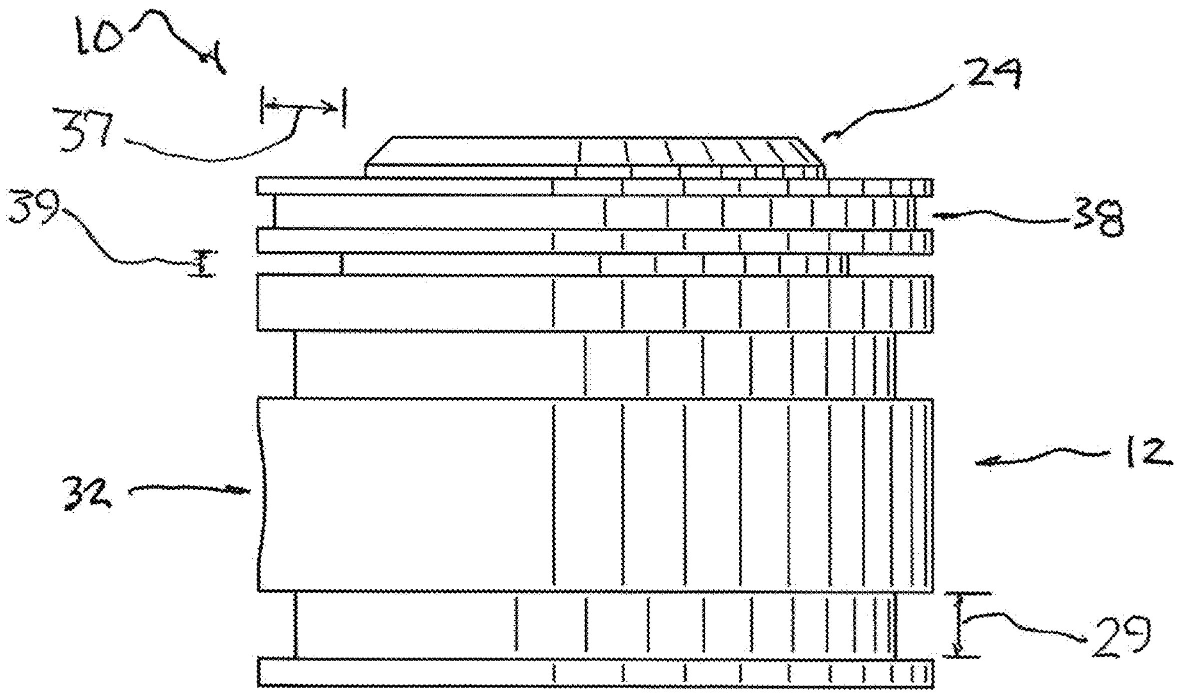
FIG. 4 is a right elevational view thereof.
Figure 5:
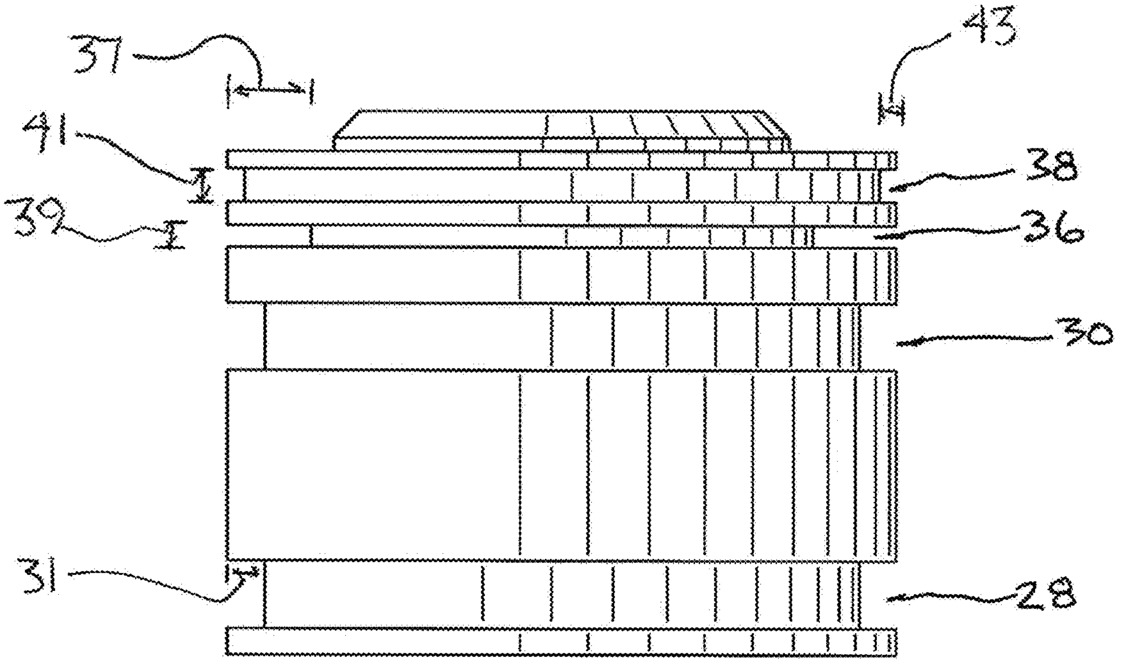
FIG. 5 is a rear elevational view thereof.
Figure 6:
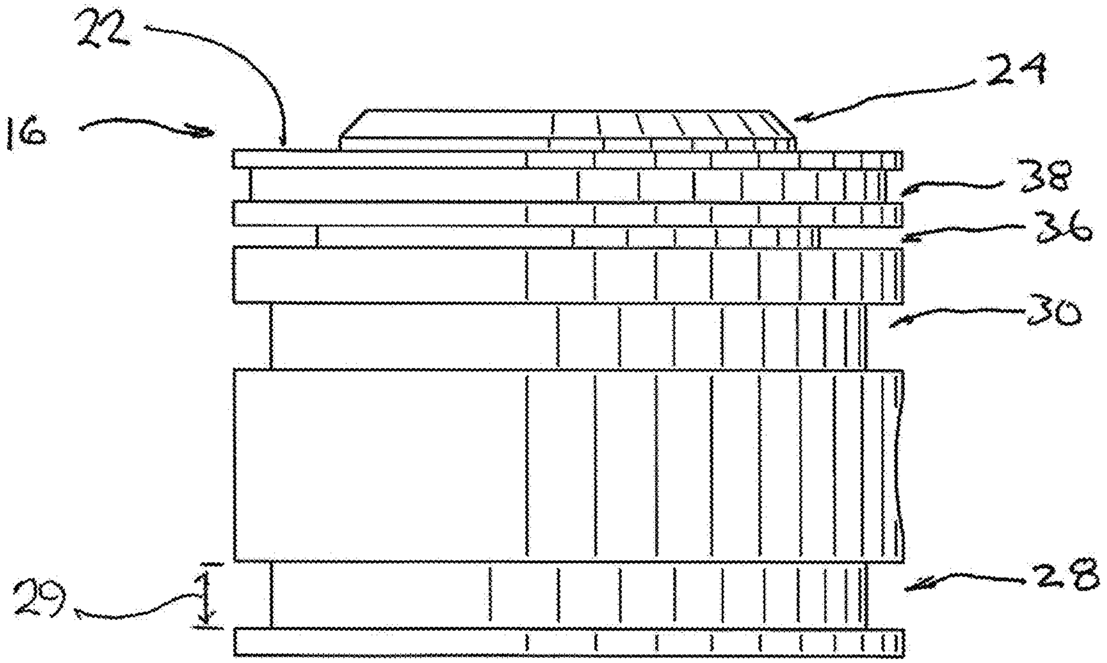
FIG. 6 is a left elevational view thereof.
Figure 7:
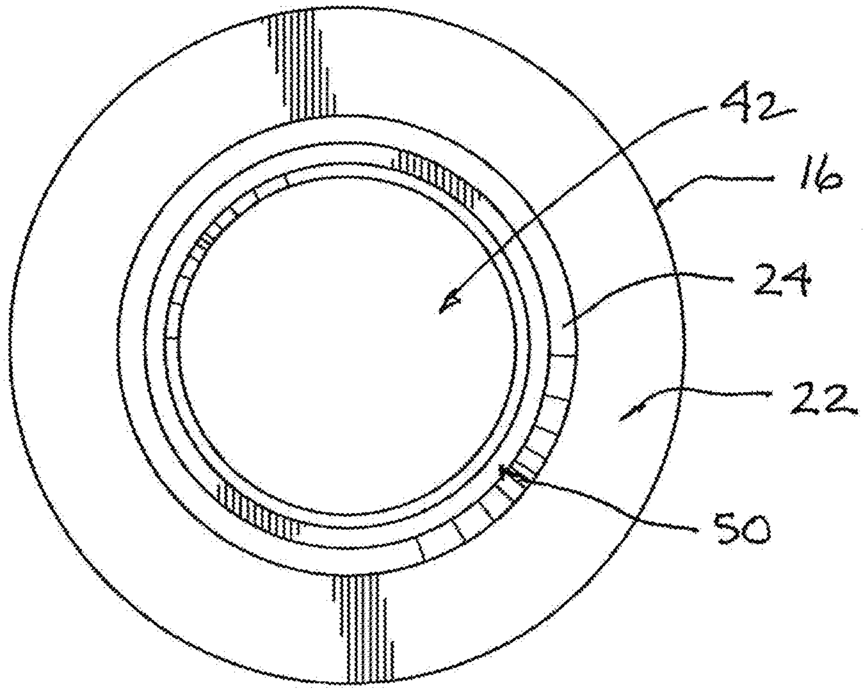
FIG. 7 is a top plan view thereof.
Figure 8:
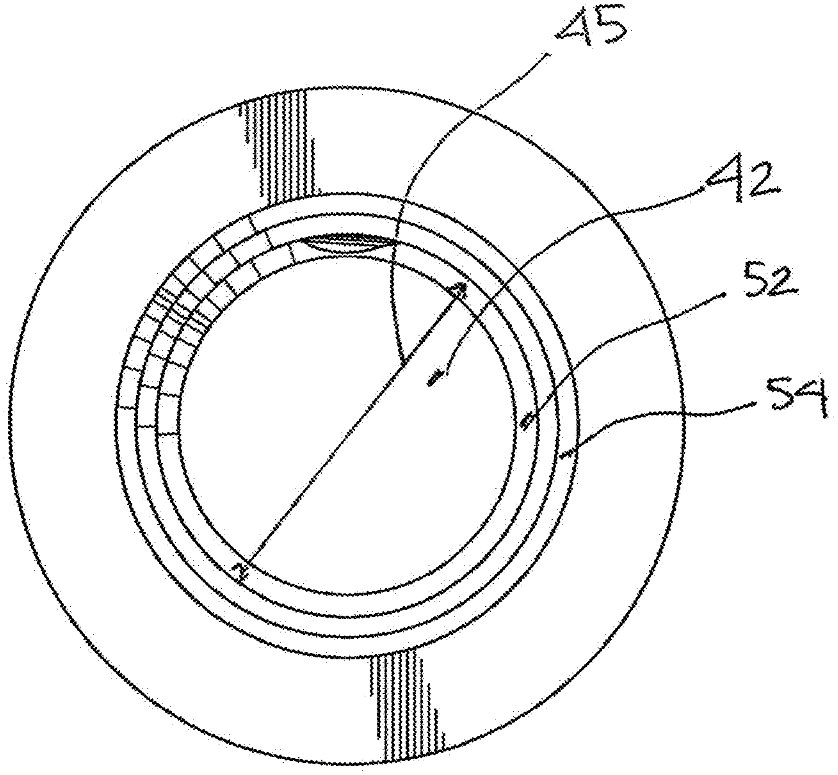
FIG. 8 is a bottom plan view thereof.
Figure 9:
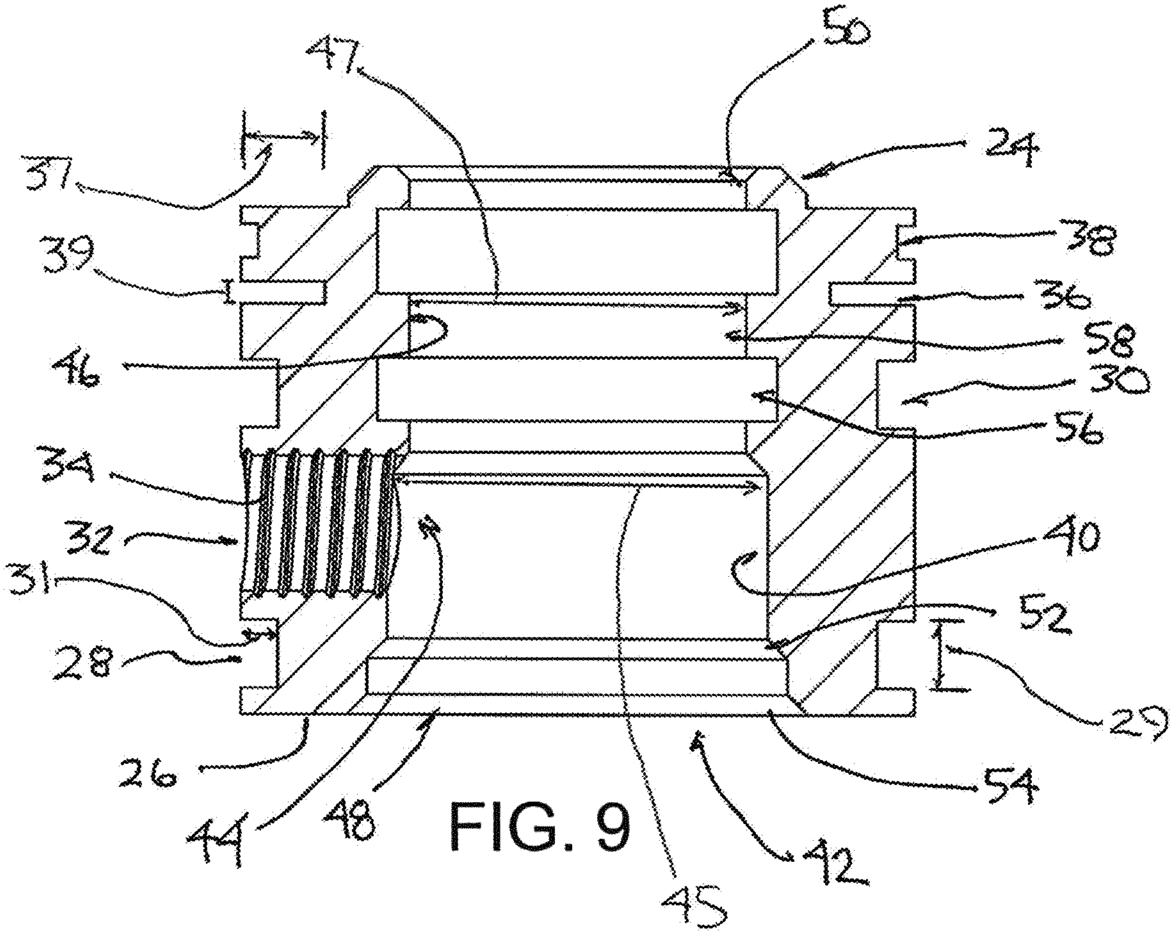
FIG. 9 is a view taken along line 9-9 of FIG. 3.
Figure 10:
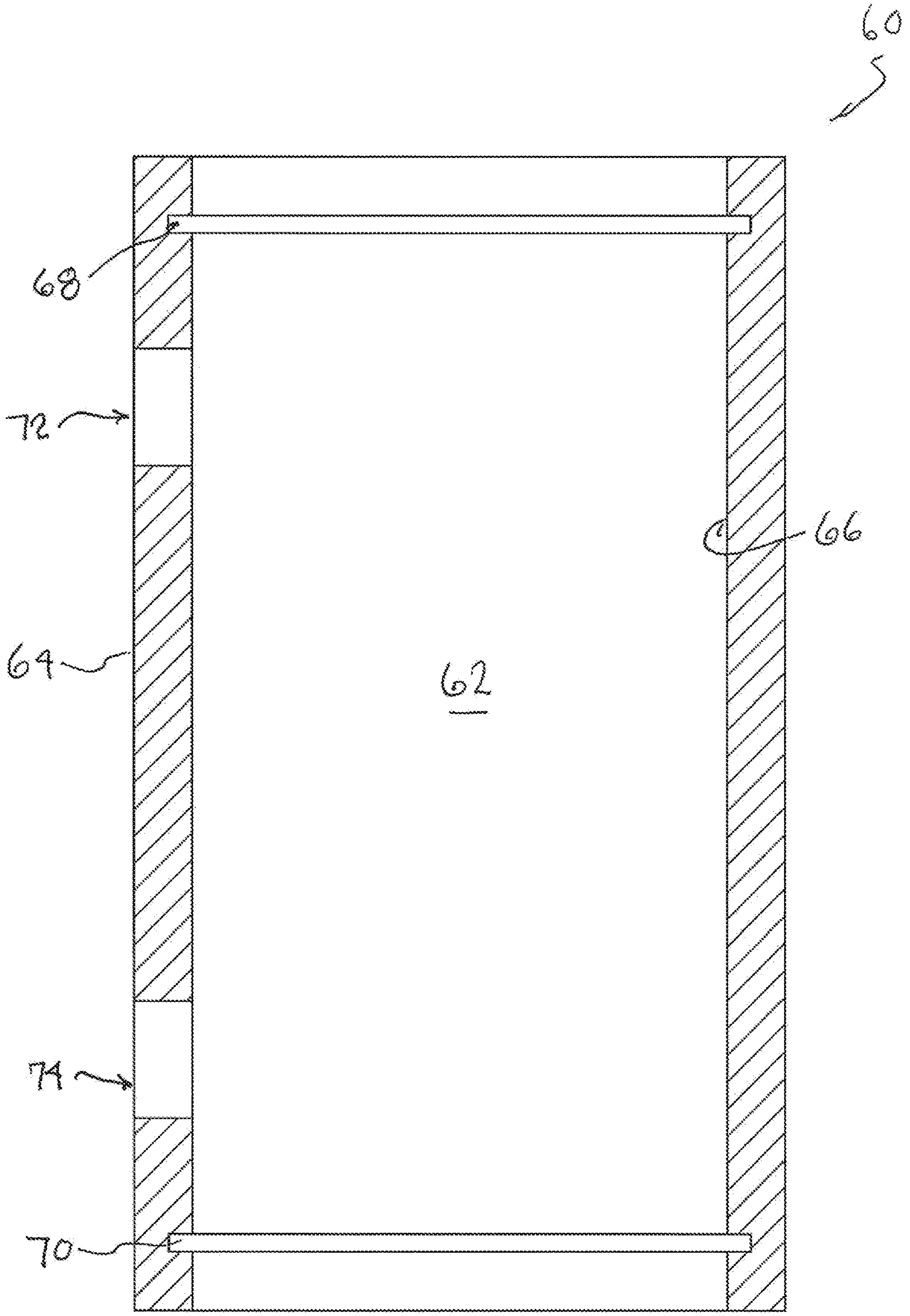
FIG. 10 is a cross sectional view of a hydraulic cylinder showing the internal snap rings and the pressure fitting apertures.

With reference now to the drawings, and in particular to FIG. 1 thereof, the preferred embodiment of the new and improved hydraulic cylinder top end cap embodying the principles and concepts of the present invention and generally designated by the reference numeral 10 will be described.

The present invention, the hydraulic cylinder top end cap 10 is comprised of a plurality of components. Such components in their broadest context includes first and second O ring groove, a snap ring groove and a sweep O ring groove. The hydraulic cylinder top end cap has a threaded aperture there in. Such components are individually configured and correlated with respect to each other so as to attain the desired objective.

A hydraulic cylinder top end cap 10 comprises several components, in combination.

There is an outer surface 12 having a round configuration, with the round configuration having a first external diameter. The outer surface has an upper portion 14, with an upper extent 16, and a lower portion 18, with a lower extent 20. There is a length between the upper extent and the lower extent.

The upper extent of the outer surface has a flat configuration 22 with a centrally located upward beveled protrusion 24. The lower extent of the outer surface has a flat circular ring configuration 26.

The lower portion of the outer surface of the top end cap has a first lower O ring groove 28 and a second upper O ring groove 30. The first lower O ring groove and the second upper O ring groove. each have a first width 29 and a first depth 31.

The lower portion outer surface has a pressure line aperture 32 therein, with the pressure line aperture having a thread 34. The pressure line aperture is located between the first lower O ring groove and the second upper O ring groove.

The upper portion of the outer surface of the hydraulic cylinder top end cap has a snap ring groove 36. The snap ring groove of the upper portion of the outer surface has a second depth 37 and a second width 39. The second depth is greater that the first depth and the second width is less than the first width. The snap ring groove of the outer surface is located between the second upper O ring groove and the upper extent of the outer surface.

The outer surface has a sweep O ring groove 38. The sweep O ring groove has a third width 41 and a third depth 43. The third width of the sweep O ring groove is less than the first lower O ring groove and the second upper O ring groove. The third width of the sweep O ring groove is greater than the second width of the snap ring groove. The third depth of the sweep O ring groove is less than the first depth of the first lower O ring groove and the second upper O ring groove.

There is an inner surface 40 of the top end cap. The inner surface of the top end cap forms a passageway 42 through the top end cap. The inner surface has a lower portion 44, with a first internal diameter 45, and an upper portion 46, with a second internal diameter 47.

The lower portion of the inner surface of the top end cap has a lower extent 48. The upper portion of the inner surface of the top end cap has an upper extent 50.

The first internal diameter of the inner surface lower portion of the top end cap is greater than the second internal diameter of the inner surface upper portion of the top end cap. The lower portion of the inner surface of the top end cap has the threaded pressure line aperture there through. The threaded pressure line aperture running from the inner surface of the top end cap to the outer surface of the top end cap.

The lower extent of the lower portion of the inner surface of the top end cap has a step 52 therein. The step of the lower extent of the lower portion of the inner surface of the top end cap has a third internal diameter. The third internal diameter of the step of the lower extent of the lower portion of the inner surface of the top end cap has an outwardly beveled lowermost extent 54. The inner surface upper portion has a lower O ring groove 56 and an upper O ring groove 58. The lower O ring groove and the upper O ring groove of the inner surface upper portion of the top end cap each have the first width and the first depth.

There is an existing hydraulic cylinder 60. The hydraulic cylinder has an internal surface 62 and an external surface 64 with a wall thickness there between. The hydraulic cylinder has a smooth inner wall 66 with an upper snap ring groove 68 and a lower snap ring groove 70. An upper aperture 72 and a lower aperture 74.

The advantage of the invention is the elimination of manufacturing steps of the hydraulic cylinder. Current manufactured hydraulic cylinders have to have a threaded end cap. The invention allows the elimination of the thread and the threading procedure in the hydraulic cylinder manufacturing process.

In practice, the O rings are placed on the top end cap, as is the snap ring and the sweep O ring. The top end cap is pushed into a hydraulic cylinder, which has a snap ring groove on the interior surface of the cylinder. The snap ring is compressed and the O rings are squeezed into the cylinder. The top end cap then is snapped into place as the snap ring expands and engages the snap ring groove of the hydraulic cylinder. A small tool allows the use to rotate the end cap, so that the threads are visible through the aperture in the hydraulic cylinder wall. A pressure line fitting is passed through the hydraulic cylinder wall aperture and is then threaded into the threaded aperture of the hydraulic cylinder top end cap. This connection locks the end cap in position. The O rings of the end cap seal off the hydraulic cylinder.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hydraulic cylinder top end cap comprising, in combination:

an outer surface having a round configuration with the round configuration having a first external diameter, the outer surface having an upper portion with an upper extent and a lower portion with a lower extent, with a length between the upper extent and the lower extent, the lower portion of the outer surface of the top end cap having a first lower O ring groove and a second upper O ring groove, the lower portion outer surface having a pressure line aperture therein, the upper portion of the outer surface of the hydraulic cylinder top end cap having a snap ring groove, the outer surface having a third sweep O ring groove; and an inner surface forming a passageway through the length of the top end cap, the inner surface having a lower portion and an upper portion, the lower portion of the inner surface of the top end cap having a lower extent and the upper portion of the inner surface of the top end cap having an upper extent, the lower portion of the inner surface of the top end cap having the pressure line aperture there through, the inner surface upper portion having a fourth lower O ring groove and a fifth upper O ring groove.

2. The hydraulic cylinder top end cap as described in claim 1, with the top end cap further comprising:

the pressure line aperture of the lower portion outer surface of the end cap having a thread; and the inner surface forming a passageway through the length of the top end cap.

3. The hydraulic cylinder top end cap as described in claim 2, with the top end cap further comprising:

the upper extent of the outer surface having a flat configuration with a centrally located upward beveled protrusion;

the first lower O ring groove of the lower portion of the end cap and the second upper O ring groove of the lower portion of the end cap each having a first width and a first depth; and the snap ring groove of the upper portion of the outer surface having a second depth and a second width, the second depth being greater than the first depth and the second width being less than the first width.

4. The hydraulic cylinder top end cap as described in claim 3, with the top end cap further comprising:

the sweep O ring groove having a third width and a third depth, the third width of the sweep O ring groove being less than the first lower O ring groove and the second upper O ring groove, the third width of the sweep O ring groove being greater than the second width of the snap ring groove, the third depth of the sweep O ring groove being less than the first depth of the first lower O ring groove and the second upper O ring groove; and an inner surface lower portion having a first internal diameter and the inner surface upper portion having a second internal diameter.

5. The hydraulic cylinder top end cap as described in claim 4, with the top end cap further comprising:

the lower extent of the outer surface having a flat circular ring configuration;

the snap ring groove of the outer surface being located between the second upper O ring groove and the upper extent of the outer surface;

the first internal diameter of the inner surface lower portion of the top end cap being greater than the second internal diameter of the inner surface upper portion of the top end cap; and the lower extent of the lower portion of the inner surface of the top end cap having a step therein with the step of the lower extent of the lower portion of the inner surface of the top end cap having a third internal diameter with the third internal diameter of the step of the lower extent of the lower portion of the inner surface of the top end cap having an outwardly beveled lowermost extent.

6. The hydraulic cylinder top end cap as described in claim 5, with the top end cap further comprising the pressure line aperture being located between the first lower O ring groove and the second upper O ring groove.

7. The hydraulic cylinder top end cap as described in claim 6, with the top end cap further comprising the lower O ring groove and the upper O ring groove of the inner surface upper portion of the top end cap having the first width and the first depth.

8. A hydraulic cylinder top end cap comprising, in combination:

an outer surface having a first upper O ring groove and a second lower O ring groove, the outer surface having a pressure line aperture therein, the outer surface having a snap ring groove and a third sweep O ring groove; and the top end cap having a lower portion and an upper portion.

9. The hydraulic cylinder bottom end cap as described in claim 8, with the top end cap further comprising:

the pressure line aperture of the lower portion outer surface being continuous with the lower portion inner surface aperture of the end cap with the aperture having the thread; and the inner surface forming a passageway through the length of the top end cap.

* * * * *